United States Patent

[11] 3,592,480

[72] Inventor Robert Koranyi, Ludvika, Sweden
[21] Appl. No. 819,632
[22] Filed Apr. 28, 1969
[45] Patented July 13, 1971
[73] Assignee Allmanna Svenska Elektriska Aktiebolaget Vasteras, Sweden
[32] Priority May 2, 1968
[33] Sweden
[31] 5906/68

[54] ADJUSTABLE GASKET
4 Claims, 2 Drawing Figs.
[52] U.S. Cl. ................................... 277/147, 277/180, 285/363
[51] Int. Cl. ........................................ F16j 15/02
[50] Field of Search ........................... 277/147, 180, 235; 285/363—368

[56] References Cited
UNITED STATES PATENTS
| 866,395 | 9/1907 | Skinner et al. | 285/363 X |
| 3,248,119 | 4/1966 | Smith et al. | 277/180 X |
| 3,279,805 | 10/1966 | Quinson | 277/180 X |

Primary Examiner—Robert I. Smith
Attorney—Jennings Bailey, Jr.

ABSTRACT: An adjustable gasket for sealing the space between two flanges which are arranged at a certain distance from each other with the help of a first and a second spacer, comprising a ribbon of elastic material arranged between the two spacers and close to the second spacer, a resilient strip of steel or the like arranged between the first spacer and the ribbon close to the ribbon, a number of pressure means situated between the flanges and arranged to press the strip and the elastic ribbon against the second spacer.

PATENTED JUL 13 1971    3,592,480

INVENTOR
ROBERT KORANYI
BY
Jennings Bailey

3,592,480

ADJUSTABLE GASKET

BACKGROUND OF THE INVENTION

In order to effect a seal between two elements provided with flanges, for example between the lid and the box of a transformer casing, it is usual to machine the surfaces facing each other between which the seal is to be made to acceptable accuracy and insert a sealing ring of elastomeric material between the surfaces. The surfaces are then pressed together with the help of bolts until a satisfactory seal is obtained. For very large units where it is difficult, or quite impossible, to machine the sealing surfaces at a reasonable cost, the sealing problem must be solved in some other way.

SUMMARY OF THE DISCLOSURE

The present invention relates to an adjustable gasket for sealing the space between two flanges which are arranged at a certain distance from each other with the help of a first and a second spacer arranged at a distance from each other. The invention is characterized in that a sealing strip of elastomeric material is arranged between the flanges and close to the second spacer, that a resilient strip is arranged between the flanges and between the sealing strip and the first spacer and that the resilient strip is adjustable in the direction of the second spacer with the help of a number of attachment means arranged in the space between the flanges.

When the resilient strip is displaced towards the second spacer the sealing strip is compressed in a direction parallel to the two surfaces and expands in a direction perpendicular thereto, thus filling all uneven parts of the surfaces and producing an effective seal.

BRIEF DESCRIPTION OF THE DRAWINGS

In the accompanying drawings

DESCRIPTION OF THE PREFERRED EMBODIMENTS

With the help of the two figures an example of one application of the invention will now be described to seal, for instance, a transformer casing.

Figure 1:
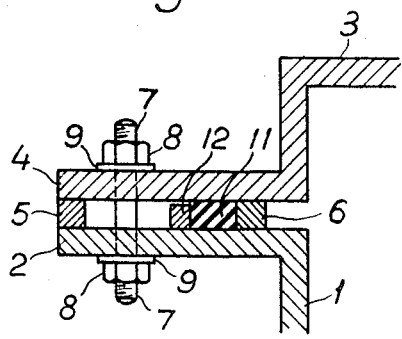
FIG. 1 shows a cross section through a seal between two flanges.
Figure 2:
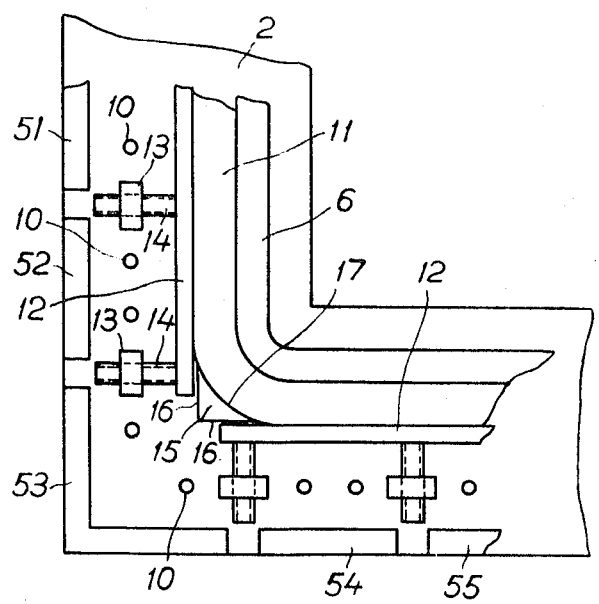
FIG. 2 is a view perpendicular to that shown in FIG. 1 with the upper flange removed.

In FIG. 1 the wall of the box is designated 1 and a flange projecting from this is designated 2. A flange 4 projects from the lid 3. The flanges 2 and 4 are held at a certain distance from each other by two spacers 5 and 6 which are welded to the flange 2, the first of which is situated at the outer edge of the flanges and consists of a number of parts 51, 52, 53, 54, 55, etc. as can be seen from FIG. 2. The second spacer 6 is unbroken and surrounds the box. The two flanges 2 and 4 are held together by a number of bolts 7 with nuts 8 and washers 9, the bolts passing through holes 10 in the flanges. Immediately outside the inner spacer 6 is a continuous sealing strip 11 of oil-resistant nitrile rubber or similar material. Outside the sealing strip on each side of the transformer box is a strip 12 of resilient material, for example spring steel. The height of the strip 12 is somewhat less than that of the spacers so that the strip is displaceable in the space between the flanges. Between the strip 12 and spacer 5 blocks 13 are welded to the flange 2 opposite the openings between the spacer parts 51, 52, 53, etc. The blocks 13 are provided with a threaded hole for a threaded screw 14 which abuts the strip 12 with its inner end. The blocks 13 and screws 14 form means to hold the strip 12 against the sealing strip 11. The outer end of the screw is shaped so that the screw can be turned with a tool inserted between said openings in the spacer 5. For example the end of the screw may be provided with a hexagonal hole for a screw key or the end of the screw can be shaped to cooperate with a spanner. The end of the screw may even be provided with a diametrical groove for an ordinary screw driver.

In order to fill out the space between the ends of two strips 12 at the corners of the box, a corner piece 15 is inserted having two outer surfaces 16 which are perpendicular to each other and abut the inside of the strip 12. The surface 17 of the corner piece facing the sealing strip 11 is curved and has a radius of curvature corresponding to the curve and dimensions of the sealing strip when fully compressed.

When the screws 14 are screwed in towards the strip 12 the sealing strip 11 is pressed against the spacer 6 and forced to expand in a direction perpendicular to the movement of the strip and thus fill out any irregularity arising in the surfaces of the two flanges 2 and 4 so that a satisfactory seal is obtained between them.

I claim:

1. Adjustable joint comprising two flanges which are arranged at a certain distance from each other with the help of a first and a second spacer arranged at a distance from each other, wherein a sealing strip of elastomeric material is arranged between the flanges and close to the second spacer and wherein a resilient strip is arranged between the flanges and between the sealing strip and the first spacer, and a plurality of means in the space between the resilient strip and the first spacer for adjustably pressing the resilient strip in the direction of the second spacer.

2. Joint according to claim 1, wherein one pressing means comprises a block attached to one of the flanges and having a threaded hole through which a threaded screw passes, the end of which abuts the resilient strip.

3. Joint according to claim 1, wherein said flanges and sealing strip extend around a corner and resilient strips are provided on both sides of the corner, a corner piece arranged to fill out the space between the ends of said resilient strips, the corner piece having two surfaces, each of which abuts a resilient strip and is parallel thereto, and having a radius of curvature of the inner surface which corresponds to the curve of the sealing strip at the corner when fully compressed.

4. Joint according to claim 1, wherein said pressing means is attached to one of the flanges.